United States Patent

McIntyre et al.

[15] 3,653,276
[45] Apr. 4, 1972

[54] REMOTE-CONTROL MIRROR SYSTEM

[72] Inventors: Matthew McIntyre; Harry Edwin Goodfellow, both of Jackson, Tenn.

[73] Assignee: Jervis Corporation, Bolivar, Tenn.

[22] Filed: Dec. 9, 1969

[21] Appl. No.: 883,488

[52] U.S. Cl. ..................................................... 74/501 M
[51] Int. Cl. ............................................................ F16c 1/12
[58] Field of Search ................... 74/501, 501 M, 501.5, 504

[56] References Cited

UNITED STATES PATENTS

| | | | |
|---|---|---|---|
| 2,931,245 | 4/1960 | Jacobson | 74/501 |
| 3,407,684 | 10/1968 | Van Noord | 74/501 M |
| 2,924,469 | 2/1960 | Moskovitz | 287/90 C |
| 3,183,736 | 5/1965 | Jacobson | 74/501 M |
| 3,253,481 | 5/1966 | Warhol | 74/501 M |
| 3,407,683 | 10/1968 | Liedel | 74/501 |
| 3,444,754 | 5/1969 | Liedel | 74/501 M |
| 3,468,186 | 9/1969 | McIntyre | 74/501 M |
| 3,473,823 | 10/1964 | Liedel | 74/501 M |
| 3,474,686 | 10/1969 | Liedel | 74/501 M |

FOREIGN PATENTS OR APPLICATIONS

| | | | |
|---|---|---|---|
| 733,744 | 5/1966 | Canada | 74/501 M |

*Primary Examiner*—Milton Kaufman
*Attorney*—Sandoe, Hopgood & Calimafde

[57] ABSTRACT

The invention contemplates a remote-control mirror system in which a completely assembled mirror unit and control unit, with interconnecting flexible control-cable means, is preloaded at the factory so that later installation of the system in a vehicle requires no adjustment to assure perfect control action. In the form described, the universal pivot action at both the control and mirror ends of the system utilizes truncated spherical bearing surfaces which establish fixed-center pivotal support at both ends. The pivots are of the non-captive variety, and factory preloading assures seating contact at both end pivots of the system, before and after assembly to the vehicle.

17 Claims, 6 Drawing Figures

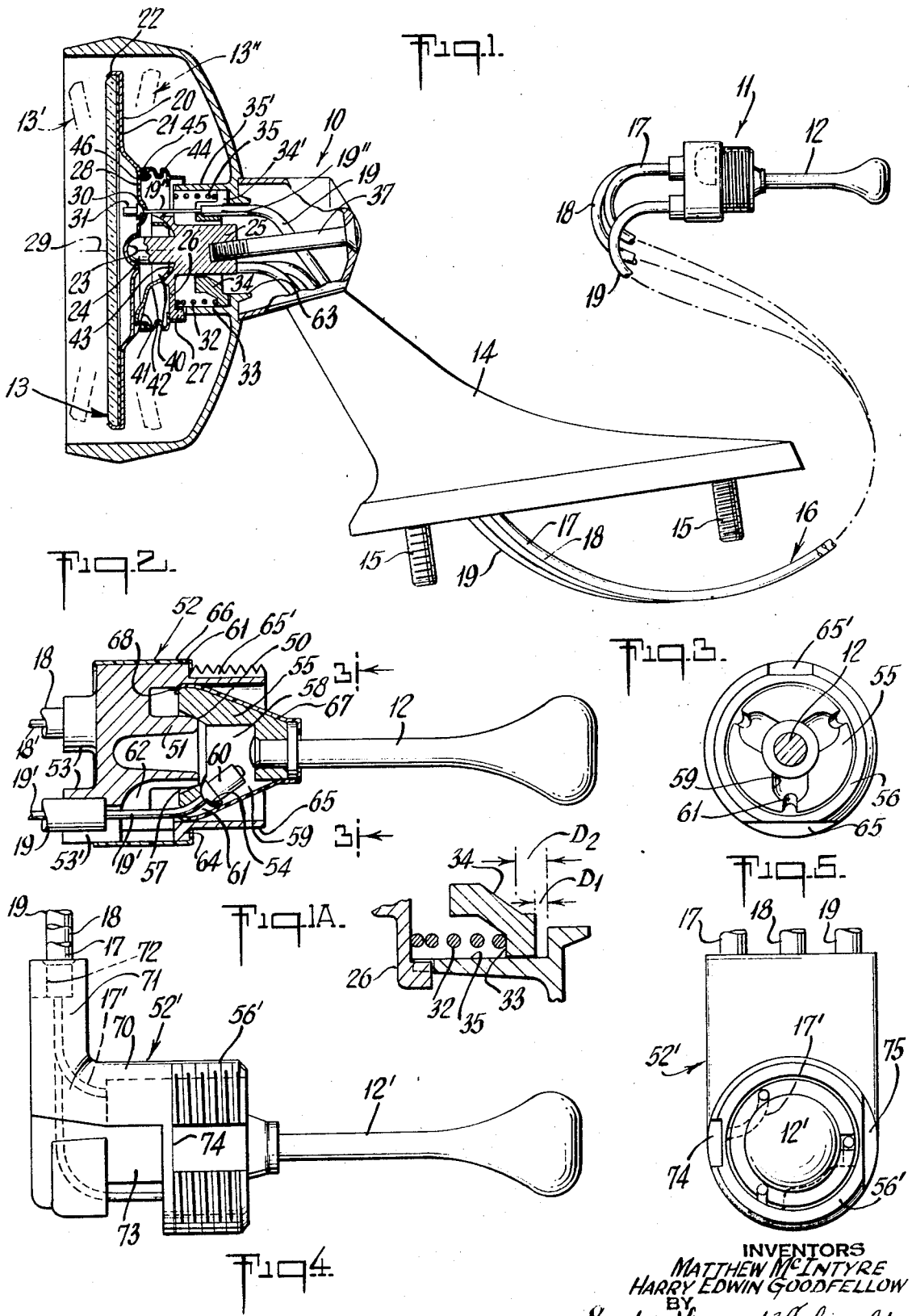

REMOTE-CONTROL MIRROR SYSTEM

This invention relates to remote-control mirror systems and in particular to the variety which involves flexible connection between a control unit and a mirror unit, each of which units is independently secured, as when installing the system in a motor vehicle.

In existing systems of the character indicated, the flexible connection must be completed to one or both of the independently secured units, after these units have been mounted on the vehicle, or during the course of mounting these units on the vehicle. In other systems, assembly of one or both of the secured end units must be completed after the fixed body-mounting element thereof has first been secured to the vehicle. In any case, these systems require provision for adjustment after application to the vehicle, in order that the control-cable system may be properly stressed or preloaded to produce most positive control action in installed position.

It is an object of the invention to provide a mirror system of the character indicated which requires no adjustment after installation.

Another object is to provide such a mirror system in which all parts of the mirror system are preassembled to each other, so as to require essentially only mounting of the control and of the mirror units to complete the installation.

A specific object is to achieve the foregoing objects with a system of preloaded, non-captive fixed-center pivotal support for both the control and mirror ends of the system.

Another specific object is to provide flexible sealing of control-element connection at both ends of the system.

A further specific object is to provide a preassembled complete system wherein the control unit and the cable may be snaked through conventional vehicle-body openings in order that cable-installation may be blind and factory preloading adjustments may not be upset in the course of installation.

It is a general object to achieve the above-stated objects with a system of basic simplicity and superior action, and involving the least possible mechanical skill in making an installation that is characterized by perfect, positive, and smooth control action, with a minimum of mechanical hysteresis.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a view in elevation through interconnected control and mirror units of the invention, the mirror unit being shown in vertical section and with an "installed" relationship of parts;

FIG. 1A is a fragmentary sectional view of part of the mirror unit of FIG. 1, shown in a factory-adjusted relationship;

FIG. 2 is an enlarged longitudinal sectional view through the control unit of FIG. 1;

FIG. 3 is a sectional view, taken at the plane 3—3 of FIG. 2;

FIG. 4 is a view in elevation of an alternative control unit; and

FIG. 5 is an end view of the unit of FIG. 4.

Briefly stated, the invention contemplates a remote-control mirror system in which a completely assembled mirror unit and control unit, with interconnecting flexible control-cable means, is preloaded at the factory so that later installation of the system in a vehicle requires no adjustment to assure perfect control action. In the form described, the universal pivot action at both the control and mirror ends of the system utilizes truncated spherical bearing surfaces which establish fixed-center pivotal support at both ends. The pivots are of the non-captive variety, and factory preloading assures seating contact at both end pivots of the system, before and after assembly to the vehicle.

In FIG. 1, the invention is shown in application to a mirror system which is completely assembled, with preloading accomplished at the factory. The system includes a mirror unit 10 and a control unit 11, the latter being customarily mounted to a vehicle-body part, such as a door panel, for access within the vehicle to the control element 12 thereof. The mirror unit 10 includes a mirror element 13 universally pivoted to mounting means, of which a decorative bracket or pedestal 14 forms a part. The pedestal 14 is shown with an enlarged base, equipped with threaded studs 15 for vehicle-mounting purposes. A length of flexible control means 16 interconnects the units 10–11 and, upon installation, will be understood to pass blind, within vehicle body parts, as between one location on the outside panel of a vehicle door to another location on the inside panel of the same door.

For the form shown, the flexible control means comprises like but independent Bowden cables 17–18–19 each of which involves a flexible inner strand or wire and an outer flexible conduit; the conduit will be understood to be a close wire helix which serves a guide for longitudinal movement of the inner strand, as dictated by control-element manipulation. At each end of the system the three control cables 17–18–19 are operative at 120° displaced locations radially offset from the universal pivot center, and each center is fixedly referenced when the installation is complete. Control is effected by tensioned (pulled) displacement of a particular one (or two) of the cable strands in a first direction (left to right in the sense of FIG. 1), and the two (or one) cable strands not pulled by reasons of manipulation at 11 are pulled in the opposite direction by reason of the reacting pivotal movement of mirror 13.

As generally indicated above, the fixed pivots are non-captive and involve coacting frusto-spherical surfaces. At the mirror end of the system, the mirror 13 includes a backing plate 20 lined with a gasket or resilient sheet 21 against which the mirror is permanently compressed, as by a rolled lip 22 overlapping the beveled edge of the mirror. A cupped central region of the plate 20 is concaved with a frusto-spherical surface 23 matching the curvature of a convex frusto-conical surface on a "fixed-center" male member 24. As shown, the member 24 is the central axial projection of slide having an enlarged body 25 and radial-flange means 26 with axial-inward sleeve formations 27. Slits or openings 28 between flange-sleeve formations 26–27 are provided at equal angular spacings from each other and about the central axis 29 appropriate to the individual accommodation of the inner strands of cables 17–18–19. For the opening 28 which appears in FIG. 1, the inner strand 19' of cable 19 is thus accommodated, for connection to an offset part of the backing plate 20. The connection is shown established by passing wire 19' through an opening in a local cusp or depression 30, and by securing a round-head crimp fastener 31 to wire 19'. Similar connection of the other two cable strands to plate 20 will be understood to apply at equal angular displacements from location 30, about the central axis 29.

In the preassembled condition of the entire system, the cabling is so resiliently loaded as to assure constant sliding or bearing contact of the mating frusto-spherical pivot surfaces, without impairing or modifying the fixed-pivot support at either end of the system. In the form shown, such preloading is accomplished at the mirror end of the system, by a compression spring 32. Spring 32 is seated at one end on the fixed reference provided by flange means 26, and at the other end it constantly loads the conduits of all cables 17–18–19, via the shoulder 33 of a movable insert 34.

Insert 34 is guided within the counterbore 35 of a sleeve or flange 35'; sleeve 35' is integral with a shell 36 which also forms part of the mirror-mounting structure, being ultimately secured to pedestal 14 by an externally accessible bolt 37. Bolt 37 is seated upon a counterbore in pedestal 14 and is threaded to the body 25, thus clamping the fixed-center frame reference for mirror 13. Insert 34 carries angularly spaced sockets 38, one for the frame-referencing of the mirror end of each control conduit 19" of cable 19 being shown thus accommodated in FIG. 1. A longitudinally extending radially outward slot 34' at each of the sockets of insert 34 facilitates assembly of the cable strands (e.g., 19') to insert 34 before the latter is placed in the counterbore 35.

Shell 36 extends radially and axially to define a cup or shroud with ample radial clearance to peripherally surround and protect mirror 13 and its actuating connections to the control cables, regardless of the degree of angular adjustment of the mirror about its fixed pivot. Phantom outlines 13′–13″ suggest a range of mirror-axis adjustment, on both sides of the median-axis positioning shown (solid outlines).

For smooth action, and for stabilizing a selected mirror orientation, the fixed-center member 24–25 positions a stabilizing spring 40, with plural resilient arms 41 having axially preloaded wiping contact with the mirror-backing plate 20, at locations between those at which cable strands are attached. To minimize friction about the pivot axis, the spider 40 has a central frusto-spherical convex formation 42, centered on the fixed center of member 24 and slidable over a similar concave surface 43 of the body 25.

To seal the described cable connections and spherical surfaces against foreign matter, a boot 44 of neoprene or other suitably flexible material surrounds the significant region. As shown, a snap ring or the like 45 engages one axial end of boot 44 into firmly located support by a circumferential succession of spaced lugs 46 struck out of the material of the backing plate 20, thus also establishing a circumferential seal to plate 20. At its other axial end, boot 44 is shown formed with resilient inward flanges which locate upon the sleeve-flange(s) 27 and which establish a circumferential seal-lip engagement around the periphery of sleeve 35′.

FIGS. 2 and 3 provide a detailed showing of the construction of the control unit 11, at the other end of the system. Basically, a fixed-center reference is established by a frusto-spherical concave surface 50 on a male element 51 forming an integral part of a generally cylindrical mounting member 52. The inward end or base of member 52 includes plural socket formations 53 for individual accommodation of the different cables 17–18–19, the control end of conduit for the cable 19 being shown seated in the socket 53 which is sectioned in FIG. 2. Sockets 53 are radially outwardly slitted as at 53′ to permit easily assembled passage of a cable wire 19′ into retained engagement behind locating abutment means 54 in the base 55 of control element 12.

As shown, the base 55 is generally conical and is received within the counterbored or sleeve end 56 of the mounting member 52. Base 55 has a flared counterbore 57 which includes a concave frusto-spherical surface of curvature matching the surface 50, so that universal action of control member 12 is between spherical surfaces, over the solid-angle range permitted by clearance with sleeve 56. The base 55 is further defined by a central cavity 58 with radially slotted passages 59 of width sufficient to accommodate insertion of a crimp collar 60 or the like anchored to the end of a cable strand 19′. A local longitudinal external groove 61 serves for guided radial insertion of the cable strand 19′, and the bottom of this groove is preferably arcuate about the fixed-pivot center, for smooth lay-up of the strand 19′ in the course of control manipulation. Enlarged radially open and angularly localized passages 62 communicate between slitted region 53′ and the counterbore of the sleeve end 56, to permit insertion of the collar 60 and its strand 19′ through the counterbore just prior to assembly to base 55 at abutment 54.

Assembly of the structure thus far described comprehends both units 10–11 and the flexible cables 17–18–19 and is performed at the factory. The cables are precut to prescribed length, and the crimped collars 60 applied to the control element end. The other ends of the cables are assembled to the insert 34, i.e., the flexible tubes are assembled to the insert and the cables pass on through it; and while in loosely assembled relation to the body 25, with the strands 19′ projecting through their openings in the cusps 30 of backing plate 20, and with the tube socket insert 34 compressing spring 32 to provide a controlled excess projection of the cable strands 19′ through plate 20, the crimp collars 31 are applied and set. Insert 34 is then released.

The control-unit ends of cables 17–18–19 are then threaded through the restricted opening 63 at the back of shell 36, and then through the interior of pedestal 14. At this point screw 37 may be set, to complete the mirror unit assembly.

The control unit 11 is then assembled to the free cable ends by first passing each cable loosely through its particular radially ported access opening 62 to and through the sleeved end 56. The crimped collar 60 of each strand 19′ is then inserted into its particular radial port 59 in the base 55 of the control element. The strands 19′ then lie longitudinally against the bottoms of their guide grooves 61. Thereupon, the conduit end for each cable is grasped and drawn backwardly (against the resiliently opposing action of spring 32) until the conduit end clears the end of its socket 53, to permit strand entry via slit 53′ and release of the conduit end into seated relation with the bottom of its socket 53. Upon performing this operation for all three cable ends, the system is basically fully assembled, and ready for shipment to the customer for his immediate installation, and without requiring further adjustment.

FIG. 1A illustrates at $D_1$ a first clearance between insert 34 and the base of the counterbore 35 which will be understood to apply after the described assembly and with all cables 17–18–19 in straight elongated array. In this condition, the spring 32 provides a predetermined preload on the system, to assure seated bearing support of the fixed-center pivot structure at both ends of the system. The remaining clearance between coils of the spring 32 is available to take up such effective expansion of cable conduit length as may result from coiling the flexible cables when the assembled system is packaged for shipment to the customer.

For the customer to install the preassembled system, the vehicle will have been apertured as necessary for passage of the control unit 11 and cabling 16 through a first panel opening, such as an opening in the outer panel of an automobile door, and openings will also have been provided for the studs 15. Thus, the cable and the control unit 11 are applied to the outer door panel and studs 15 secured by suitable nut means, preferably with a neoprene gasket seal between the pedestal 14 and the adjacent door panel. The cable and the control unit will have also been threaded as necessary within the door, i.e., between its inner and outer panels, to avoid interference with window-positioning mechanism, and to provide the degree of horizontal and vertical offset from pedestal 14 best suited to the convenience of the vehicle operator. At the desired location on the inner panel of the door, the sleeved end 56, which is preferably threaded up to a short radial flange or shoulder 64, is passed through a precut opening in the inner panel of the door, to the point of seating against flange 64. Preferably, the sleeved end 56 is formed with a flat 65 at one side and a key way 66 on the opposite side, for unambiguous keying reference to corresponding chordal and radially inwardly projecting formations which characterize the door panel opening at which sleeve 56 is applied and seated. A decorative finishing nut (not shown) is applied to the threads of the sleeve 56 to complete the mounting of the control unit 11 to the inner panel of the door. The system is now fully installed and ready for use.

In the course of making an installation of the character indicated, the circuitous path of the cabling will have meant an effective lengthening of the cable conduits, thus creating a further displacement of insert 34 (and accompanying further compression of spring 32) from the extent $D_1$ to the greater extent $D_2$ (see FIG. 1A). By having correctly selected the constant of spring 32, and its preloading for the factory assembled condition $D_1$, and knowing the length of cable between units 10–11 for a given customer's requirements, together with the number and magnitude of cable bends between ultimately installed positions of the units 10–11, the extent $D_2$ of insert displacement can be predetermined and correlated to produce the desired installed preload of the system pivots. In practice, we have found it desirable that the factory assembled displacement shall achieve a minimum preload in the order of 2 to 3 pounds, and that the desired ultimate preload achieved upon installed displacement to the extent $D_2$ is in the order of 9 to 11 pounds.

The described assembly will be understood to have been simplified for purposes of emphasizing the cable-assembly technique. Obviously, for example, assembly of the stabilizing spring device 42 and the boot 44 would be coordinated as appropriate to the described order of assembly steps. Also, it will be appreciated that boot techniques may be applied to seal and protect parts and improve appearance at the control element 11. For example, a neoprene sleeve 66 stretched around the rear half of the mounting body 52 (and including a lip around flange 64) provides substantial closure of the radial ports 62. Also, a plastic sleeve 67, as of polyethylene, may be slipped over control element 12 as a final assembly step, with a snap-lip retention at 68 to the base 55, to close off the ported openings 59; for clarity, sleeve 67 is not shown in FIG. 3.

FIGS. 4 and 5 show a modification wherein the control unit is L-shaped, i.e., in which the median axis of the control element 12' is at a right angle to the direction of entry of the cables 17–18–19 into the mounting member 52'. The latter comprises a generally cylindrical body 70 having an open sleeved end 56' similar to that described at 56 in FIGS. 2 and 3 and accommodating control element 12' in analogous fashion. To present minimum thickness, as when the space between window mechanism and an inside panel is very close, the tail or radial offset portion 71 of the mounting member 52' is flattened by aligning in a single plane the spaced parallel sockets (e.g., at 72) for the individual cable-conduit ends. Around the outer surfaces of the bend of the "L," and between individual sockets 72 and an access port 73 to the inner volume of sleeve 56', suitably rounded and routed guide grooves accommodate individual cable strands; for example, the strand 17' is seen to bend 90° in its path from offset 71 to body 70 (FIG. 4) and it is connected at the "8 o'clock" position to the base of element 12' (FIG. 5). Installation is secured by relying on chordal and key formations in a door panel opening, as previously described. FIGS. 4 and 5 further serve to illustrate that a circumferential flange is not necessary for location in the door panel; the chordal and key formations end at limited shoulders, as at 74–75, which may provide adequate location, and may be secured by a nut threaded on the sleeve 56'. Again, a resilient shroud or sleeve (not shown) may be added to the assembled control unit of FIGS. 4 and 5 to substantially seal off the slotted and ported regions of the mounting member 52'.

The described constructions will be seen to achieve the stated objects. The system is fully factory assembled, with precision-cut cables that establish an assured level of pivot-bearing preload during handling and shipment, plus a desired greater preload when installed. All this is achieved without adjustment, once assembled at the factory. Moreover, the desired result is achieved with fixed centers, meaning that maximum solid angle of control element and mirror movement are inherently achievable, regardless of differently preloaded conditions of the bearing elements. In use, the preferred location of the resilient preload close to the mirror is found to contribute to superior action, without any "mushy" feeling in the control; another contributing factor is the location of the control-element center (and of its cable-strand connections) substantially at the local plane to which it is mounted. And regardless of which control-unit configuration is used, the actuator and cable can be readily threaded in and snaked through the passages, openings and clearances normally encountered with a vehicle wall member, such as an automobile door; in particular, the described control units may be passed through standard ¾-inch diameter holes in interior bulkheads, brackets or the like.

While the invention has been described in detail for the preferred forms shown, it will be understood that modifications may be made without departure from the invention.

We claim:

1. A preassembled remote-control mirror system for vehicular installation, comprising a mirror unit and a control unit interconnected only by a length of flexible Bowden cable means, each of said units comprising a male member having a fixed-center truncated spherical convex bearing surface and including means for local attachment to a different part of the vehicle, a movable control member having a truncated concave spherical bearing surface riding the fixed-center surface of one male member, a movable mirror member having a truncated concave spherical bearing surface riding the fixed-center surface of the other male member; said Bowden cable means comprising outer flexible-conduit means axially referenced to said male members at corresponding angular positions about a median axis of limited motion of each movable member about its fixed-center, said Bowden cable means further comprising inner flexible-cable means connected at opposite ends to each movable member at corresponding angular locations offset from the median axis, the inner-cable connections at one unit being substantially normal to a plane normal to the median axis and near the fixed center at said one unit; and fixedly preset resilient means located at said one unit symmetrically about the median axis at said one unit and preloading the spherical surface engagements to a level less than that desired when installed in a vehicle in which the straight-line distance between said units is less than said length, said resilient means and adjacent inner-cable connections being fully and inaccessibly contained within said one unit, said preset resilient means being compressionally stressed to a first level when said system is preassembled with said Bowden cable means extended straight between said units, the stiffness of said resilient means and said first level of compressional stress being so selected that a predetermined greater compressional stress will be automatically achieved for a particular vehicular installation of said system in which the installed distance between said units is less than said straight-line distance; whereby merely by assembling said system to the vehicle, the desired tension is achieved in said cable means to establish a predetermined frictional relation of the bearing surfaces at said units.

2. A mirror system according to claim 1, in which said preloading means is located only at said mirror unit.

3. A preassembled remote-control mirror system for vehicular installation, comprising a mirror unit and a control unit interconnected only by corresponding lengths of plural flexible Bowden cables, each of said units comprising mounting means including a male member having a fixed-center truncated spherical convex bearing surface and including means for local attachment to part of the vehicle, each of said units including a movable member having a truncated spherical bearing surface riding the fixed-center bearing surface of the associated male member, one of said movable members including a control element and the other of said movable members including a mirror element; said Bowden cables each comprising an outer flexible conduit axially referenced to said mounting members at corresponding angular positions about a median axis of limited motion of each movable member about its fixed center, said Bowden cables each further including an inner flexible strand connected at opposite ends to each movable member at corresponding angular locations offset from the median axis; the axial reference at one of said units including a slide guided for movement with respect to the corresponding male member along substantially the median axis at said one unit, and spring means located at said one unit symmetrically about the median axis at said one unit and reacting between said slide and said corresponding male member and in fixedly preset preloading relation to the bearing engagements at both said units, said slide and spring means being fully and inaccessibly contained at said one unit, said spring means being preset in compressional stress to a first level when said system is preassembled with said Bowden cables extended straight between said units, the stiffness of said spring means and the first level of compressional stress being so selected that a predetermined greater compressional stress will be automatically achieved for a particular vehicular installation of said system in which the installed distance between said units is less than said straight-line distance; whereby merely by assembling said system to the vehicle, the desired tension is achieved in said cable means to establish a predetermined frictional relation of the bearing surfaces at said units.

4. A preassembled remote-control mirror system for vehicular installation, comprising a mirror unit and a control unit interconnected only by a length of flexible Bowden cable means, each of said units comprising a male member having a fixed-center truncated spherical convex bearing surface and including means for local attachment to a different part of the vehicle, a movable control member having a truncated concave spherical bearing surface riding the fixed center surface of one male member, a movable mirror member having a truncated concave spherical bearing surface riding the fixed-center surface of the other male member; said Bowden cable means comprising outer flexible-conduit means axially referenced to said male members at corresponding angular positions about a median axis of limited motion of each movable member about its fixed-center, said Bowden cable means further comprising inner flexible-cable means connected at opposite ends to each movable member at corresponding angular locations offset from the median axis; and fixedly preset resilient means preloading the spherical surface engagements to a level less than that desired when installed in a vehicle in which the straight-line distance between said units is less than said length; said preloading means being located only at said mirror unit and comprising a slide guided for limited reciprocation with respect to said male member and on the median axis at the mirror unit, the mirror-unit end of the Bowden cable means being referenced to said slide, and said preloading means comprising preloaded spring means reacting between said male member and said slide in the direction to maintain compressional seating of said bearing surfaces.

5. A mirror system according to claim 4, in which mounting means at said mirror unit includes an elongated sleeve within which said slide is guided, said male member having sleeve-flange means abutting an end of said sleeve and coaxially locating the same, whereby said spring means is fully contained within said sleeve.

6. A mirror system according to claim 5, in which said mounting means includes a shrouded shall peripherally surrounding said mirror member and integrally related to said sleeve.

7. A mirror system according to claim 6, in which said mounting means includes a body-mounting pedestal abutting said shell and through which said cable means passes, and externally accessible means for selectively clamping said male member against said shell.

8. A mirror system according to claim 5, in which said spring is preloaded in compression between said slide and said sleeve-flange means, and in which abutment means at the inner end of said sleeve determines a rear limiting position of said slide; and further in which, for the condition of said system unassembled to a vehicle and with said Bowden cable means elongated straight between said units, a clearance is established between said slide and said abutment to a predetermined relatively small extent which will allow the slide to be forcibly further displaced when accommodating the intended circuitous path of cable alignment in the ultimate vehicle installation, whereby in the course of installation of said system in a vehicle, said slide will be forced into greater clearance with respect to said abutment and the preloaded fixed-center seating of said mirror member and of said control member may both depend upon the preloading reaction between compression of said conduits against tension of the flexible cables associated therewith, both before and after installation in a vehicle.

9. A mirror system according to claim 4, in which said mirror member includes a backing plate to which said inner-flexible cable means is locally secured within a given radial offset from the local concave spherical bearing surface, and an annular flexible boot having sealed engagement at one end to said backing plate at a location outside said given radius and extending in axially overlapping sealed relation with the location of flexible-conduit reference at the mirror unit.

10. A mirror system according to claim 4, in which said means for local attachment of said control unit comprises an elongated body having a sleeve portion at one end, the convex spherical surface of said male member being positioned within and in radial-clearance relation with said sleeve portion, said control member at bearing engagement with said convex spherical surface being also positioned within and in such radial-clearance relation with said sleeve as to provide a desired solid angle of adjustment of control-member angularity within said sleeve, and means on said sleeve for securing said control unit to the edge of a circular vehicle body-wall opening.

11. A mirror system according to claim 10, in which said last-defined means includes a radial flange at substantially the radial plane which includes the fixed center of the pivotal support of said control member.

12. A mirror system according to claim 10, in which said inner-cable means is connected to said control member within said sleeve.

13. A mirror system according to claim 12, in which said inner-cable means is connected to said control member at substantially that radial plane about the control-member axis which includes the fixed center of the pivotal support of said control member.

14. A mirror system according to claim 10, in which said body includes Bowden conduit receiving sockets at equal angular locations about the median axis of control-member freedom.

15. A mirror system according to claim 10, in which said body includes Bowden conduit receiving sockets at equal angular locations about an axis at substantially 90° to the median axis of control-member freedom.

16. A mirror system according to claim 10, in which said body is radially ported to permit assembly of said cable ends through said sleeve, and a resilient seal member circumferentially surrounding said body and substantially closing said radial porting.

17. A preassembled remote-control mirror system for vehicular installation, comprising a mirror unit and a control unit interconnected only by a length of flexible Bowden cable means, each of said units comprising a male member having a fixed-center truncated spherical convex bearing surface and including means for local attachment to a different part of the vehicle, a movable control member having a truncated concave spherical bearing surface riding the fixed center surface of one male member, a movable mirror member having a truncated concave spherical bearing surface riding the fixed-center surface of the other male member; said Bowden cable means comprising outer flexible-conduit means axially referenced to said male members at corresponding angular positions about a median axis of limited motion of each movable member about its fixed-center, said Bowden cable means further comprising inner flexible-cable means connected at opposite ends to each movable member at corresponding angular locations offset from the median axis; and fixedly preset resilient means preloading the spherical surface engagements to a level less than that desired when installed in a vehicle in which the straight-line distance between said units is less than said length; said mirror member including a backing plate and said preloading means including a resilient stabilizing insert having a central opening by which said stabilizing insert is located about the median axis of said male member, said stabilizing insert having plural angularly spaced axially resilient radian arms in axially stressed wiping contact with angularly spaced local areas of said backing plate.

* * * * *

Dedication 3,653,276.—*Matthew McIntyre* and *Harry Edwin Goodfellow*, Jackson, Tenn. REMOTE-CONTROL MIRROR SYSTEM. Patent dated Apr. 4, 1972. Dedication filed Oct. 1, 1976, by the assignee, *Harman International Industries, Inc.*

Hereby dedicates the entire term of said patent to the Public.

[*Official Gazette February 1, 1977.*]